United States Patent
Erno et al.

(10) Patent No.: US 12,435,932 B2
(45) Date of Patent: Oct. 7, 2025

(54) HEAT EXCHANGER ASSEMBLY FORMED OF A LATTICE STRUCTURE WITH A PLURALITY OF SHELL STRUCTURE UNIT CELLS

(71) Applicant: General Electric Company, Schenectady, NY (US)

(72) Inventors: Daniel Jason Erno, Clifton Park, NY (US); Sathyanarayanan Raghavan, Ballston Lake, NY (US)

(73) Assignee: General Electric Company, Evendale, OH (US)

( * ) Notice: Subject to any disclaimer, the term of this patent is extended or adjusted under 35 U.S.C. 154(b) by 445 days.

(21) Appl. No.: 17/971,022

(22) Filed: Oct. 21, 2022

(65) Prior Publication Data

US 2024/0133641 A1 Apr. 25, 2024
US 2024/0230249 A9 Jul. 11, 2024

(51) Int. Cl.
*F28F 7/02* (2006.01)
*B33Y 80/00* (2015.01)
*F28D 7/00* (2006.01)
*F28D 21/00* (2006.01)

(52) U.S. Cl.
CPC ............... *F28F 7/02* (2013.01); *B33Y 80/00* (2014.12); *F28D 7/0008* (2013.01); *F28D 2021/004* (2013.01); *F28F 2210/02* (2013.01); *F28F 2255/18* (2013.01)

(58) Field of Classification Search
CPC ...... F28F 7/02; F28F 2210/02; F28F 2255/18; F28D 7/0008; F28D 2021/004; B33Y 80/00
See application file for complete search history.

(56) References Cited

U.S. PATENT DOCUMENTS 2,821,369 A * 1/1958 Hilliard ............... F28F 7/02
165/145
6,482,520 B1 * 11/2002 Tzeng ............... H01L 23/3733
165/905

(Continued)

FOREIGN PATENT DOCUMENTS

EP        1023469 A1    8/2000

OTHER PUBLICATIONS

Boswell et al., Cracking During Thermal Post-Processing of Laser Powder Bed Fabricated CM247LC Ni-Superalloy, Materials & Design, vol. 174, Jul. 15, 2019, 14 Pages. https://doi.org/10.1016/j.matdes.2019.107793.

*Primary Examiner* — Raheena R Malik
(74) *Attorney, Agent, or Firm* — Dority & Manning, P.A.

(57) ABSTRACT

An additively manufactured heat exchanger assembly formed of a lattice structure with a plurality of shell structure unit cells. The plurality of shell structure unit cells each include at least one junction and a plurality of connectors coupled to the junction. The junction and the plurality of connectors form an integral surface. The heat exchanger assembly further includes a fluid boundary wall defined within the lattice structure to define an active heat exchanger portion. The active heat exchanger portion includes at least one working fluid contained within the fluid boundary wall. Further, at least one of the plurality of shell structure unit cells extends through and beyond the fluid boundary wall. Further, the shell structure unit cells may be isotropic.

20 Claims, 10 Drawing Sheets

(56) References Cited

U.S. PATENT DOCUMENTS

| | | | |
|---|---|---|---|
| 6,623,687 B1* | 9/2003 | Gervasi | B29C 64/40 |
| | | | 264/401 |
| 8,453,717 B1* | 6/2013 | Roper | H01L 23/3733 |
| | | | 165/80.4 |
| 10,107,555 B1* | 10/2018 | Miller | B23P 15/26 |
| 10,690,419 B2 | 6/2020 | Koga et al. | |
| 11,892,245 B2* | 2/2024 | Gerstler | B33Y 80/00 |
| 12,013,187 B2* | 6/2024 | Wiedenhoefer | B33Y 80/00 |
| 12,209,813 B2* | 1/2025 | Gerstler | F28D 7/1607 |
| 2008/0135212 A1* | 6/2008 | Queheillalt | F28D 15/0233 |
| | | | 165/104.13 |
| 2016/0202003 A1* | 7/2016 | Gerstler | F28D 9/00 |
| 2016/0332259 A1 | 11/2016 | Jones et al. | |
| 2017/0282454 A1 | 10/2017 | Garry et al. | |
| 2017/0367218 A1* | 12/2017 | Gerstler | F28D 9/0093 |
| 2018/0187984 A1* | 7/2018 | Manzo | F28F 13/12 |
| 2018/0297843 A1* | 10/2018 | Lo | B01J 19/243 |
| 2018/0299066 A1* | 10/2018 | Erno | F16S 5/00 |
| 2019/0030878 A1* | 1/2019 | Barua | B29C 64/386 |
| 2019/0033013 A1 | 1/2019 | Byfield | |
| 2019/0041280 A1* | 2/2019 | Subramaniyan | F01D 21/14 |
| 2019/0277576 A1 | 9/2019 | Toubiana | |
| 2020/0018560 A1* | 1/2020 | Sabo | B23P 15/26 |
| 2020/0363133 A1* | 11/2020 | Gerstler | F28D 7/1607 |
| 2021/0033354 A1* | 2/2021 | Streeter | F28D 9/0037 |
| 2021/0071959 A1* | 3/2021 | Streeter | F28D 7/16 |
| 2021/0180885 A1* | 6/2021 | Wiedenhoefer | F28F 13/06 |
| 2021/0293483 A1* | 9/2021 | Gerstler | F28F 9/22 |
| 2021/0333055 A1 | 10/2021 | Colson et al. | |
| 2021/0348856 A1 | 11/2021 | Fujiwara | |
| 2021/0362276 A1* | 11/2021 | Pisanu | B22F 10/28 |
| 2022/0196337 A1* | 6/2022 | Torresin | H01L 21/4871 |
| 2022/0307778 A1* | 9/2022 | Wang | F28F 9/02 |
| 2023/0124112 A1* | 4/2023 | Tholence | F28F 7/02 |
| | | | 165/104.11 |
| 2023/0304743 A1* | 9/2023 | Becene | F28F 21/00 |
| 2023/0314094 A1* | 10/2023 | Brodeur | F28F 7/02 |
| | | | 165/164 |
| 2024/0033092 A1* | 2/2024 | Parthasarathy | A61F 2/30771 |
| 2024/0093952 A1* | 3/2024 | Turney | F28F 9/0221 |
| 2024/0159471 A1* | 5/2024 | Gerstler | F28F 7/02 |
| 2024/0230249 A9* | 7/2024 | Erno | F28D 7/1646 |
| 2024/0254919 A1* | 8/2024 | Gerlach | F02C 7/18 |

* cited by examiner

HEAT EXCHANGER ASSEMBLY FORMED OF A LATTICE STRUCTURE WITH A PLURALITY OF SHELL STRUCTURE UNIT CELLS

FEDERALLY SPONSORED RESEARCH

This invention was made with government support under contract number DE-AR0001120 awarded by the Advanced Research Projects Agency-Energy (ARPA-e). The U.S. government may have certain rights in the invention.

FIELD

The present disclosure generally relates to additively manufactured components, and more particularly to additively manufactured components, such as heat exchanger assemblies.

BACKGROUND

Gas turbine engines generally include a turbine section downstream of a combustion section that is rotatable with a compressor section to rotate and operate the gas turbine engine to generate power, such as propulsive thrust. Typically, the turbine section defines a high-pressure turbine in serial flow arrangement with an intermediate pressure turbine and/or low-pressure turbine. The high-pressure turbine includes an inlet or nozzle guide vane between the combustion section and the high-pressure turbine rotor. The nozzle guide vane generally serves to accelerate a flow of combustion gases exiting the combustion section to more closely match or exceed the high-pressure turbine rotor speed along a tangential or circumferential direction. Thereafter, turbine sections generally include successive rows or stages of stationary and rotating airfoils, or vanes and blades, respectively.

At least some gas turbine engine components are manufactured for internal light-weighting using additive manufacturing. Internal light-weighting uses periodic internal unit cells to replace internal structures of solid components. Each internal unit cell includes a node and at least one beam coupled to the node. Each beam is coupled to the node of another internal unit cell to form a repeating periodic lattice structure within a component, such a gas turbine engine component or an additively manufactured heat exchanger. The internal unit cells reduce the weight of otherwise solid components, while maintaining the ability of the component to carry a load.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
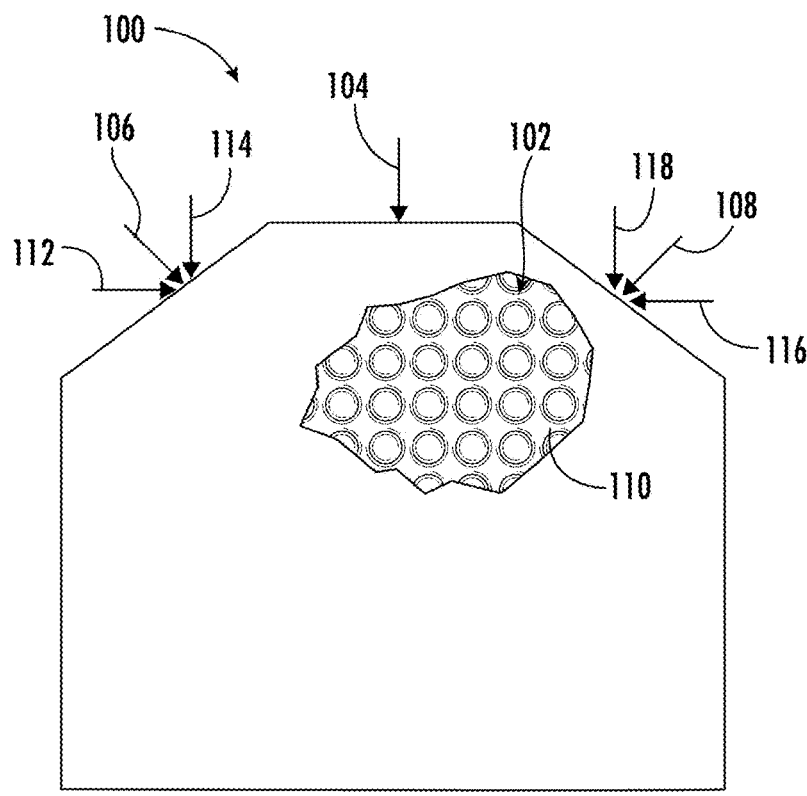
FIG. 1 shows a partial cut-away view of a rotary machine component that includes a lattice structure according to embodiments of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

As used herein, the terms "first", "second", "third" and so on may be used interchangeably to distinguish one component from another and are not intended to signify location or importance of the individual components.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

At least some gas turbine engine components are manufactured for internal light-weighting using additive manufacturing. Internal light-weighting uses periodic internal unit cells to replace internal structures of solid components. Each internal unit cell includes a node and at least one beam coupled to the node. Each beam is coupled to the node of another internal unit cell to form a repeating periodic lattice structure within a component, such a gas turbine engine component or an additively manufactured heat exchanger. The internal unit cells reduce the weight of otherwise solid components, while maintaining the ability of the component to carry a load. At least some of the internal unit cells, however, are orthotropic, or stiffer, in a first direction than in a second direction.

At least some unit cells include hollow nodes and beams (i.e., shell structure unit cells) to further reduce the mass and weight of the lattice structure, while maintaining the ability of the component to carry a load. Such internal shell structure unit cells are also orthotropic, or stiffer, in a first direction than in a second direction. If the component containing the shell structure unit cells is loaded asymmetrically, the stiffness of the component is different in the first direction from the stiffness in the second direction. Thus, the light-weighted component containing the shell structure unit cell will not have the same reaction to asymmetrical loading as an equivalent component without the lattice structure.

Further, certain additively manufactured shell structure unit cells, such as those used in heat exchangers, may be susceptible to increased stress, particularly when modeling software is not capable of producing smooth transitions from one shell structure unit cell to the next. Stress risers frequently form where unit cells contact the outer walls of the geometry due to the structural stiffness discontinuities at these locations. These stress risers can contribute to failure of the component.

Accordingly, the present disclosure is generally directed to additively manufactured components, such as heat exchanger assemblies, formed of a lattice structure with a plurality of shell structure unit cells that addresses the aforementioned issues. In particular embodiments, for example, the plurality of shell structure unit cells each include at least one junction and a plurality of connectors coupled to the junction. Thus, the junction and the plurality of connectors form an integral surface. The heat exchanger assembly further includes a fluid boundary wall defined within the lattice structure to define an active heat exchanger portion of the heat exchanger assembly. The active heat exchanger portion includes at least one working fluid contained within the fluid boundary wall. Further, at least one of the plurality of shell structure unit cells extends through and beyond the fluid boundary wall. Further, the shell structure unit cells may be isotropic, i.e., the stiffness is substantially the same when measured in any direction, and the resultant component containing the shell structure unit cells may have the same reaction to asymmetrical loading as an equivalent component without the internal lattice (i.e., a solid component).

Referring now to the drawings, FIG. 1 is a partial cut away view of an embodiment of a component 100, such as a gas turbine engine component, having a lattice structure 102 according to the present disclosure. In the illustrated embodiment, the lattice structure 102 replaces a solid material or structure within the component 100 and facilitates reducing a density of the component 100 while maintaining the ability of the component 100 to carry a load, such as loads 104, 106, and 108. In particular, as shown, the lattice structure 102 includes a plurality of shell structure unit cells 110 arranged in a lattice configuration within the component 100.

The shell structure unit cells 110 are configured such that a stiffness of the component 100 is isotropic. That is, the stiffness of the component 100 is substantially the same in all directions. In the illustrated embodiment of FIG. 1, three loads 104, 106, and 108 are applied to the component 100. The load 104 applies a vertical load to component 100. The load 106 applies an angular load to component 100, and includes a horizontal component 112 and a vertical component 114. The side load 108 applies an angular load to the component 100, and includes a horizontal component 116 and a vertical component 118. In the illustrated embodiment, the lattice structure 102 and the shell structure unit cells 110 are configured such that the stiffness of the component 100 is substantially the same when the vertical load components 104, 114, and 118 are applied to the component 100 as when the horizontal load components 112 and 116 are applied to the component 100. Moreover, the lattice structures 102 is configured such that the stiffness of the component 100 is substantially the same when the component 100 is asymmetrically loaded as when symmetrically loaded. That is, the stiffness of the component 100 is substantially the same when only the left side load 106, the right side load 108, or the vertical load 104 is applied to the component 100.

Figure 2:
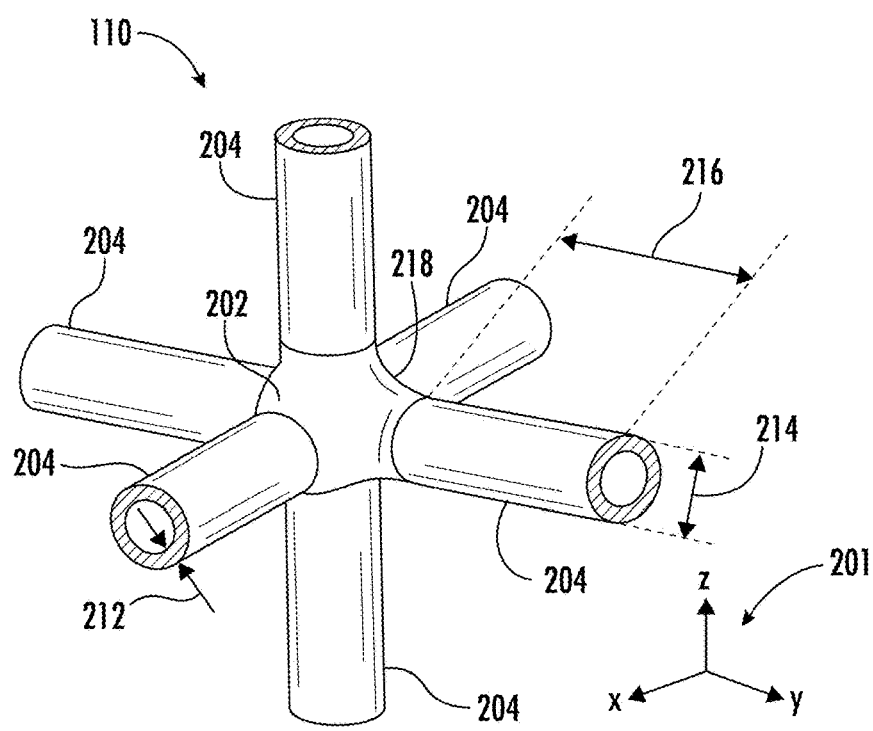
FIG. 2 is a perspective view of a shell structure unit cell according to embodiments of the present disclosure.
Figure 3:
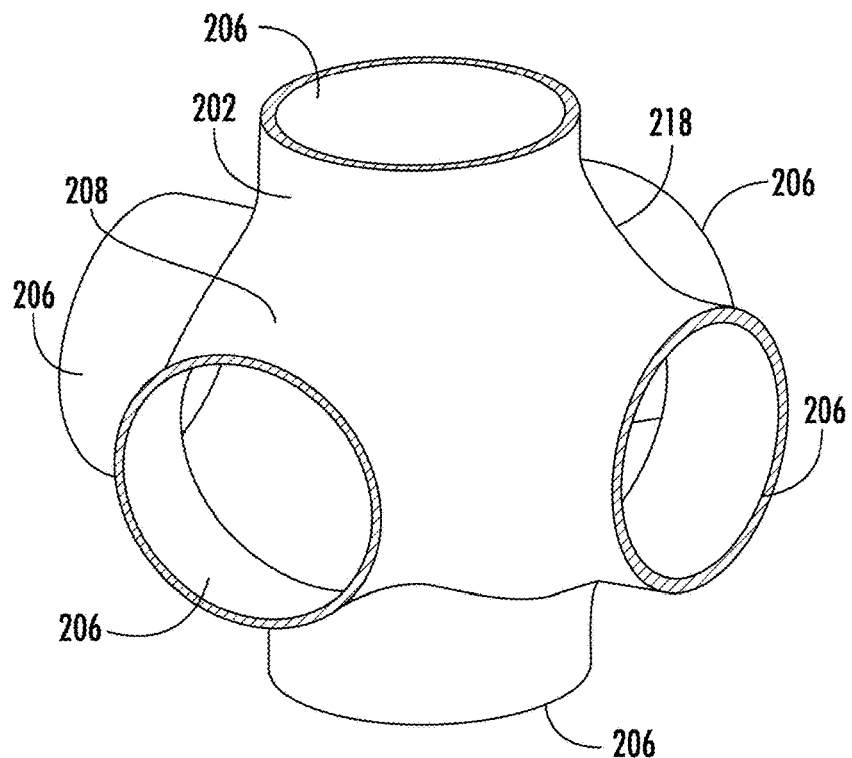
FIG. 3 is a perspective view of the junction of the shell structure unit cell illustrated in FIG. 2.
Figure 4:
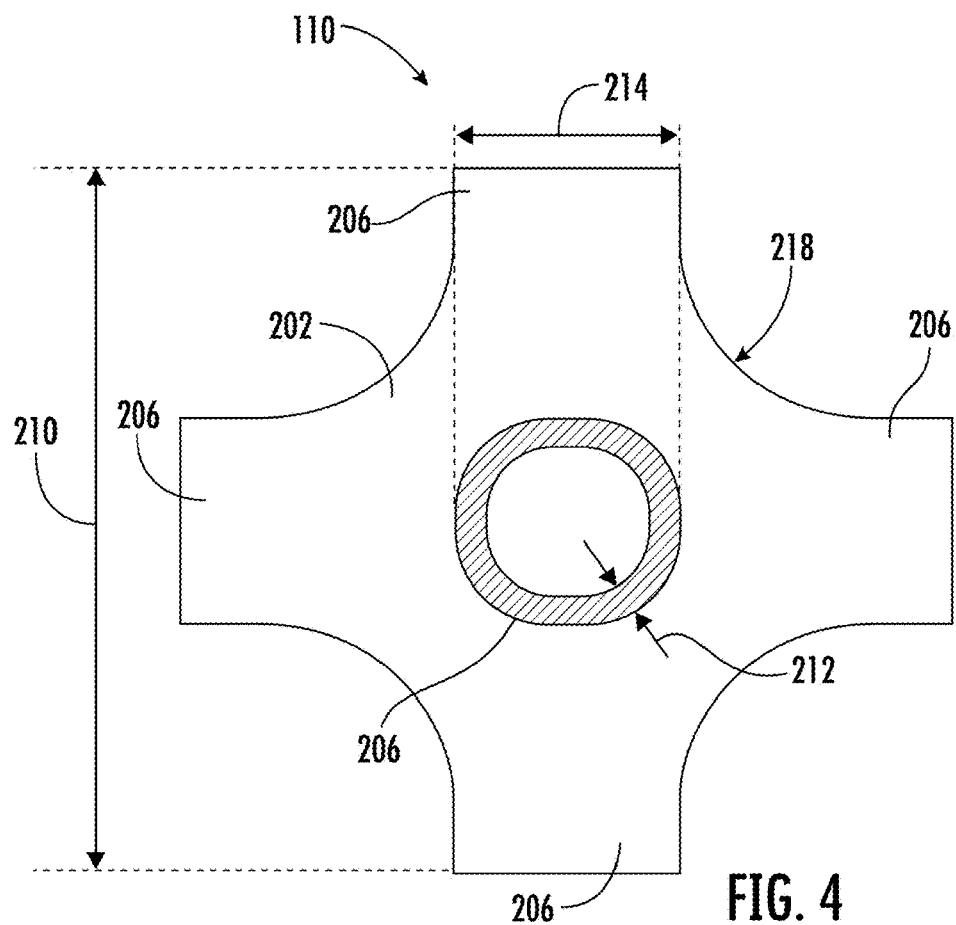
FIG. 4 is a side view of the junction illustrated in FIG. 3.

FIG. 2 is a perspective view of an embodiment of a shell structure unit cell, such as the shell structure unit cell 110 of FIG. 1, according to the present disclosure. FIG. 3 is a perspective view of an embodiment of a junction 202 of the shell structure unit cell 110 of FIG. 1. FIG. 4 is a side view of the junction 202 of FIG. 3. In the illustrated embodiment, the shell structure unit cell 110 includes at least one junction 202 and a plurality of connectors 204. In particular, the shell structure unit cell 110 includes one junction 202 and six connectors 204 coupled to the junction 202. The junctions 202 and the connectors 204 are shown as discrete, separate parts of the shell structure unit cell 110 for convenience only.

More specifically, in the illustrated embodiment of FIGS. 2-4, the shell structure unit cell 110 is an axes-of-coordinates-style unit cell, i.e., each of the connectors 204 extends away from the central junction 202 along a line parallel to one of the three axes (X, Y, and Z) illustrated by a coordinate system 201. The coordinate system 201 includes an ordered triplet of axes that are pair-wise perpendicular. Therefore, in an embodiment, the resulting lattice structures 102 includes any number of junctions 202 and connectors 204, and the individual shell structure unit cells 110 of the lattice structure 102 include one junction 202 and an ordered triplet of connectors 204 that are pair-wise perpendicular.

In another embodiment, the shell structure unit cell 110 is a monolithic component manufactured using an additive manufacturing system, and not a combination of discrete junctions 202 and connectors 204 as illustrated in FIGS. 2-4. As such, the lattice structure 102 of the component 100 is also a monolithic component. That is, the shell structure unit cells 110 of the component 100 define a contiguous, continuous, and monolithic lattice structure 102 that is integral or complex.

Returning to the illustrated embodiment of FIGS. 2-4, the connectors 204 are substantially the same and have a cylindrical tubular shape, i.e., they form a hollow cylindrical shape. The connectors 204 include a wall thickness 212, a diameter 214, and a connector length 216. Consequently, the connectors 204 may take any shape and configuration that enables the shell structure unit cell 110 to function as described herein.

As shown particularly in FIG. 4, the junction 202 includes a junction length 210 and a plurality of connection locations 206 configured to couple the connectors 204 to the junction 202. Additionally, the junction 202 is hollow and includes an outer shell wall 208 having a wall thickness 212. The outer shell wall 208 includes a curved surface that blends each connection location 206 to an adjacent connection location 206 with a full radius 218, as best shown in FIG. 4. The connection locations 206 extend from outer shell wall 208 and include a sectional shape that is complementary to or corresponds to a sectional shape of the connectors 204. The junction 202 includes six connection locations 206. Moreover, the connection locations 206 include a circular shape with diameter 214 to complement or correspond to the cylindrical tubular shape of the connectors 204. In another embodiment, the outer shell wall 208 has a thickness different than wall thickness 212 of the connectors 204. Further, the junction 202 includes any number of connection locations 206 that enables the shell structure unit cell 110 to function as described herein. Moreover, the connection locations 206 include any shape and size that enables shell structure unit cell 110 to function as described herein.

Returning to the illustrated embodiment of FIGS. 2 and 4, the junction length 110, the thickness 212, the diameter 214, and the connector length 216 are configured to form an isotropic shell structure unit cell 110. Each isotropic shell structure unit cell 210 has a stiffness that is substantially the same in all directions. The shell structure unit cell 110 has wall thickness 212 values that range between and including about 0.05 millimeters (mm) (0.002 inches (in.)) and about 0.5 mm (0.020 in.), and more particularly, in a range between and including about 0.1 mm (0.004 in.) and about 0.15 mm (0.006 in.), and preferably range between and including about 0.12 mm (0.005 in.) and about 0.14 mm (0.006 in.). Moreover, the junction length 210 includes values in a range between and including about 5.0 mm (0.197 in.) and about 1.0 mm (0.039 in.), and more particularly, in a range between and including about 4.5 mm (0.177 in.) and about 2.0 mm (0.079 in.), and preferably in a range between and including about 4.0 mm (0.157 in.) and about 3.0 mm (0.118 in.). Furthermore, the diameter 214 includes values in a range between and including about 2.0 mm (0.079 in.) and about 0.1 mm (0.004 in.), and more particularly, in a range between and including about 1.5 mm (0.059 in.) and about 0.4 mm (0.016 in.), and preferably in a range between and including about 1.25 mm (0.049 in.) and about 0.7 mm (0.028 in.).

In another embodiment, the wall thickness 212 is about 0.13 mm (0.005). In another embodiment, the junction length 210 is about 3.5 mm (0.138 in.). In another embodiment, the diameter 214 is about 0.9 mm (0.035 in.). In another embodiment, the wall thickness 212 includes any value that enables the shell structure unit cell 110 to function as described herein. Similarly, the junction length 210 includes any length that enables shell structure unit cell 110 to function as described herein. Similarly, the diameter 214 includes any value that enables shell structure unit cell 110 to function as described herein.

Figure 5:
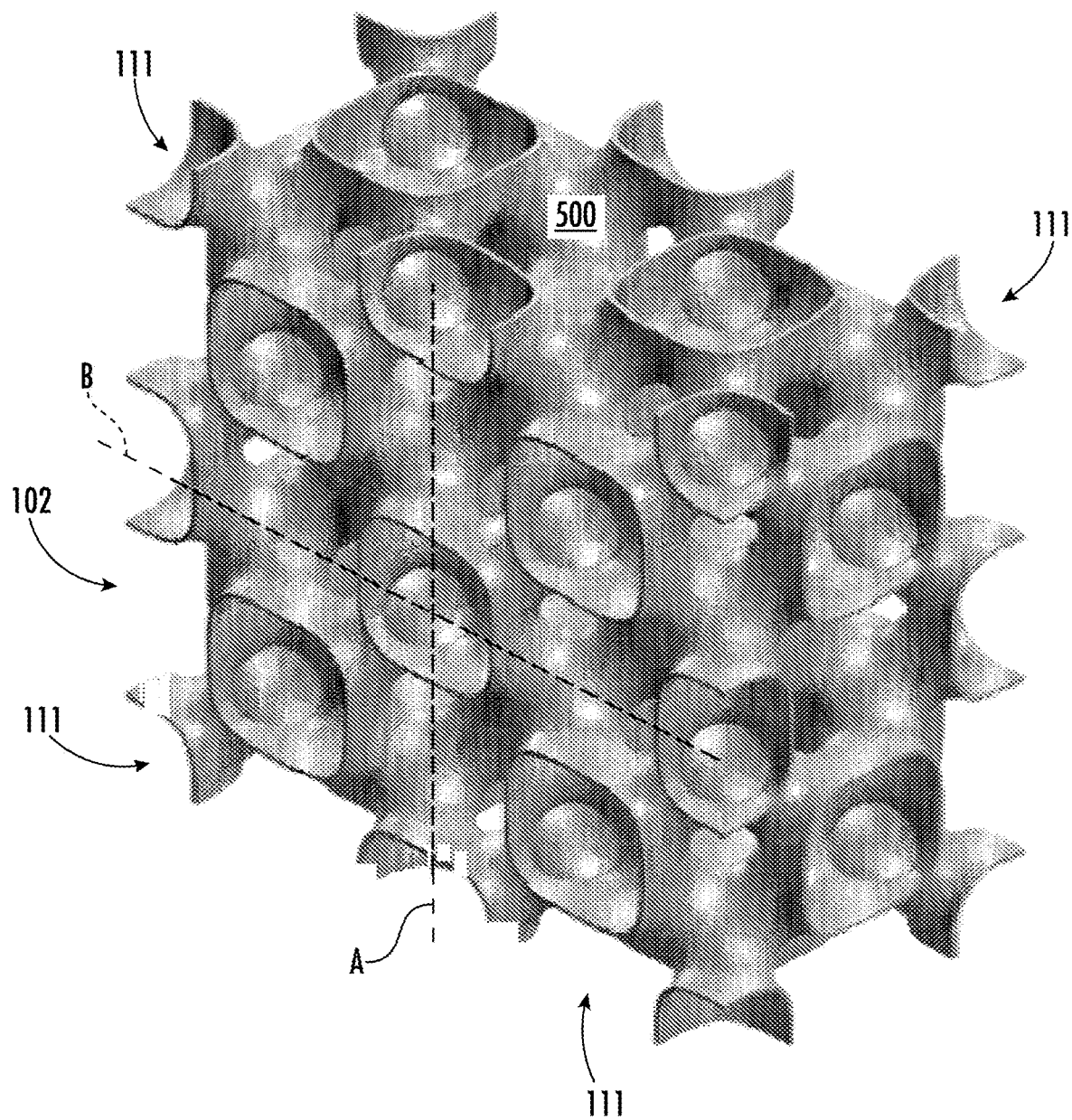
FIG. 5 is a perspective view of a lattice structure comprising a plurality of shell structure unit cells according to embodiments of the present disclosure.

Referring now to FIG. 5, a perspective view of another embodiment of a lattice structure 102 having a plurality of shell structure unit cells 500 is illustrated according to the present disclosure. Specifically, as shown, four shell structure unit cells 500 are coupled together to form a portion of component 100. In particular, the four shell structure unit cells 500 are shown coupled together with the individual cell boundaries denoted by dashed lines "A" and "B".

Figure 6:
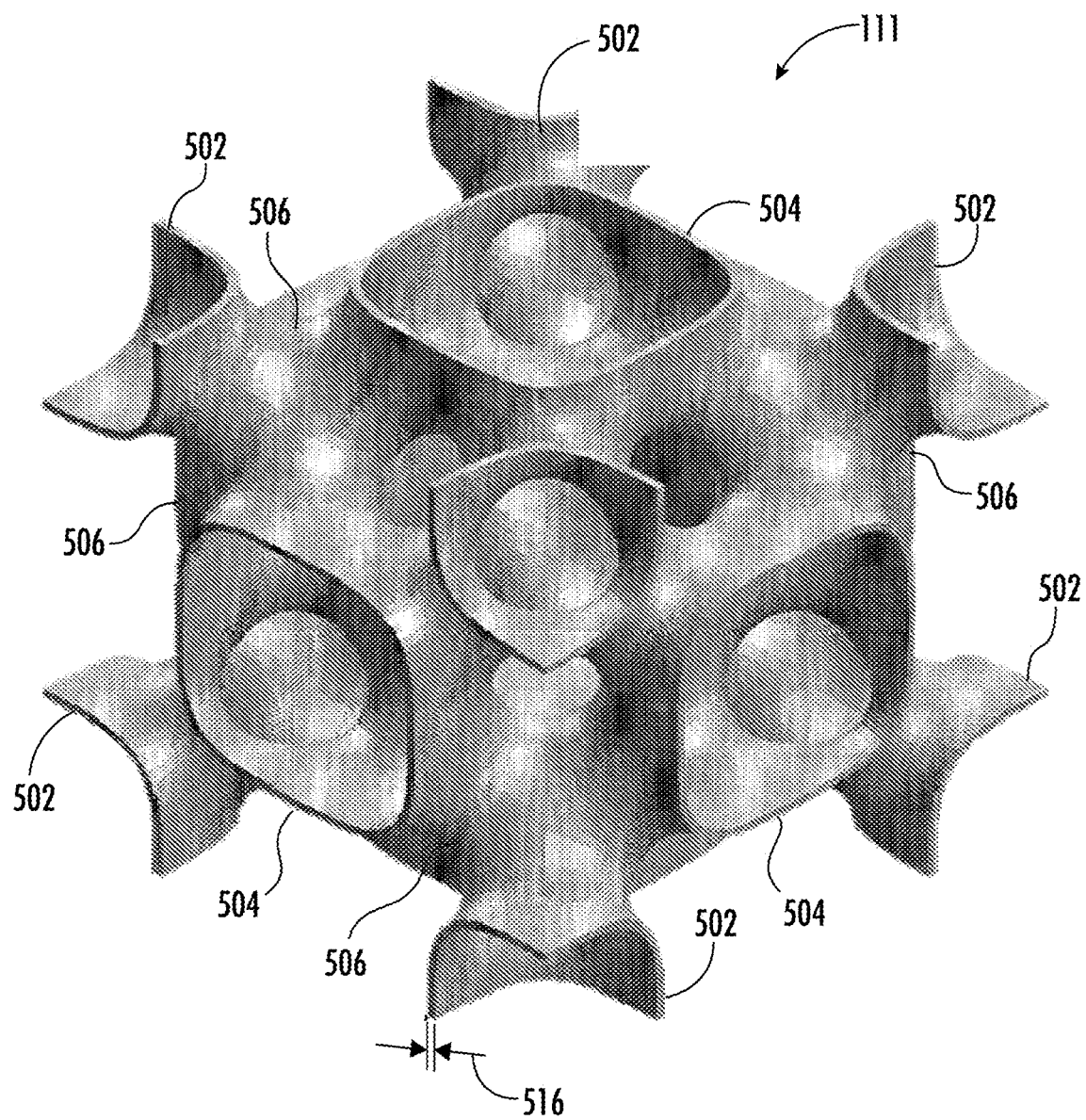
FIG. 6 is a perspective view of a single shell structure unit cell of the plurality of shell structure unit cells illustrated in FIG. 5.
Figure 7:
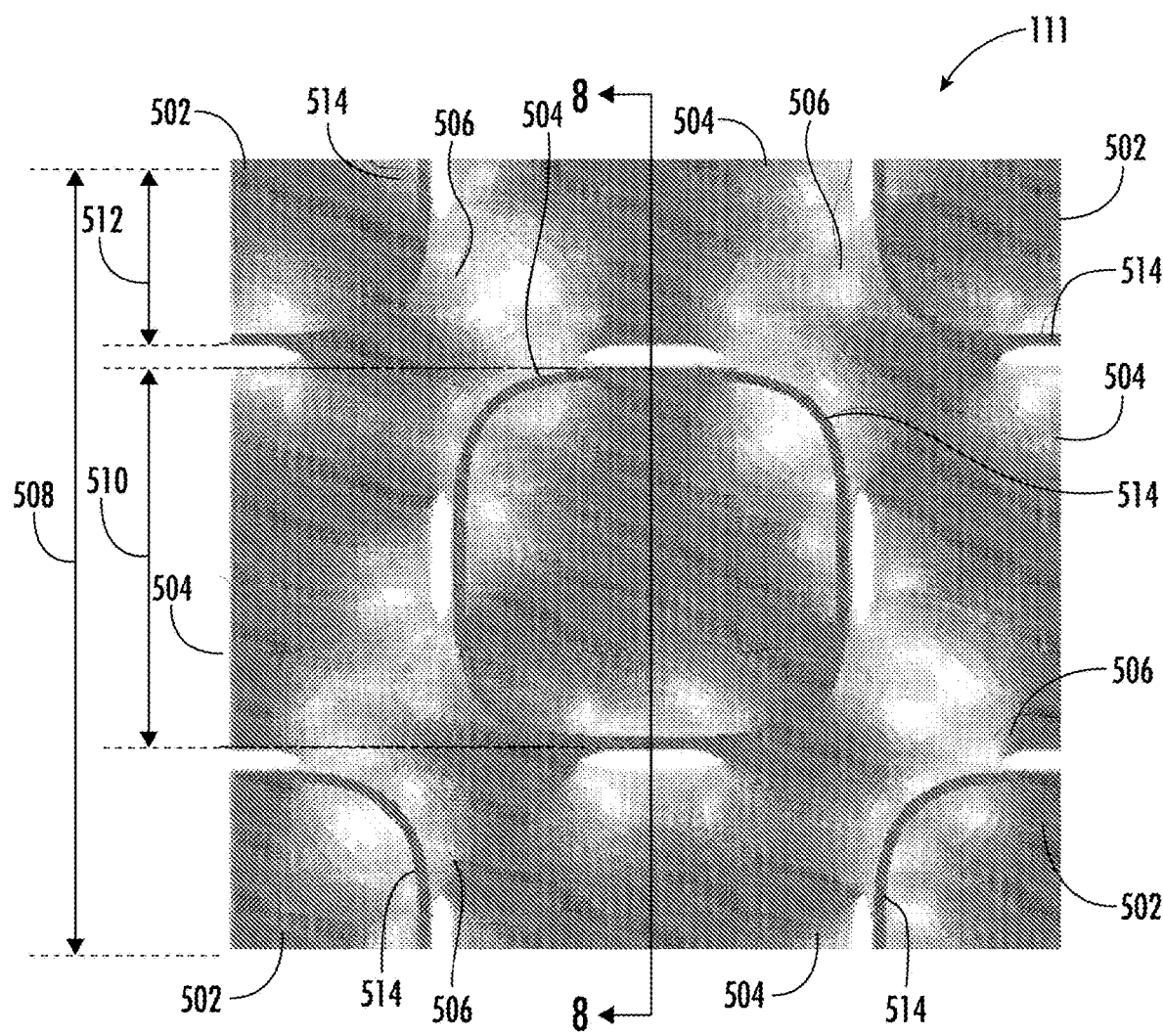
FIG. 7 is a front view of the shell structure unit cell illustrated in FIG. 6.
Figure 8:
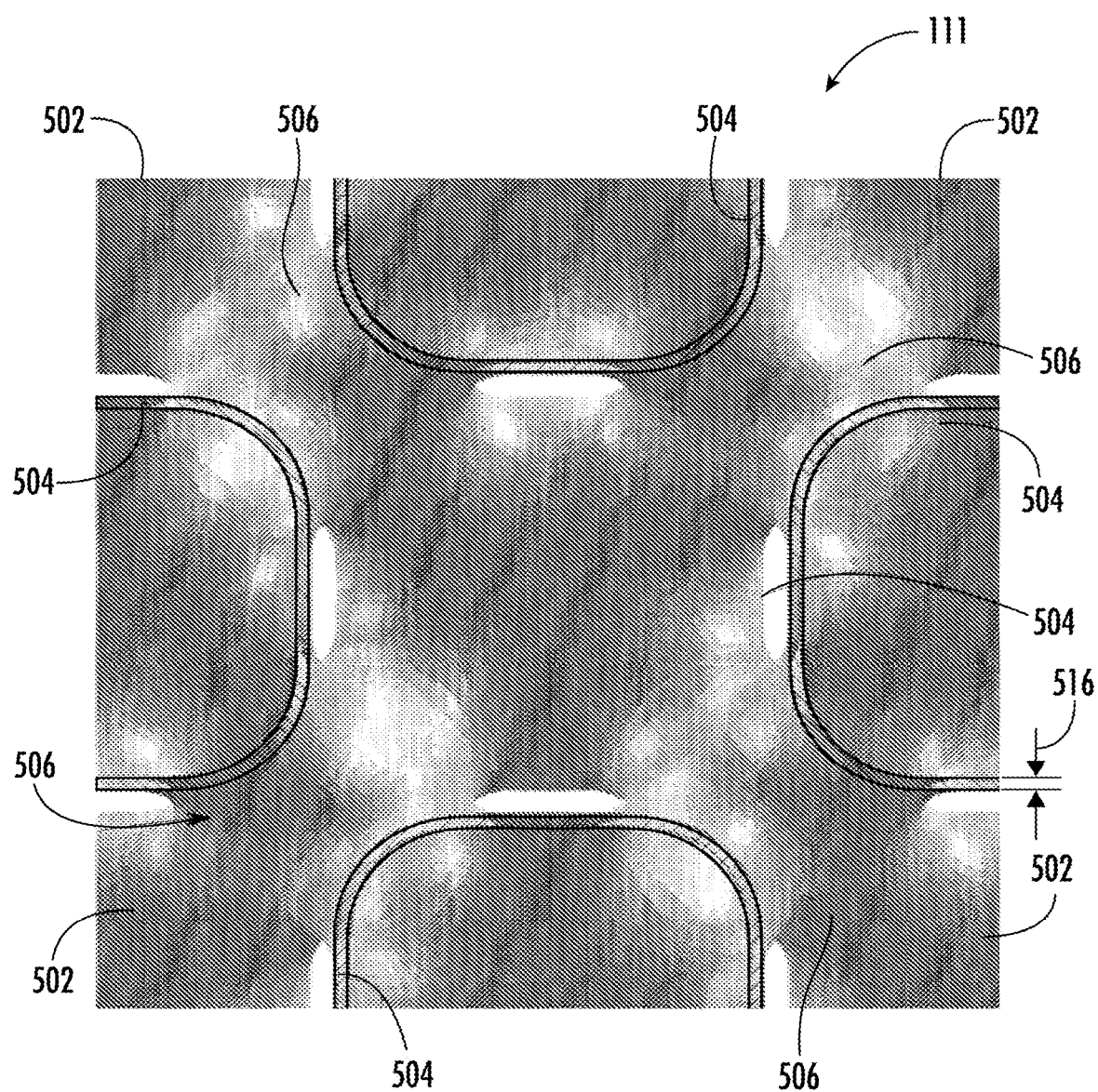
FIG. 8 is a section view of the shell structure unit cell illustrated in FIG. 6 along section line 8-8.

Referring now to FIG. 6, a perspective view of a single shell structure unit cell 111 is illustrated according to the present disclosure. Moreover, FIG. 7 is a front view of the shell structure unit cell 111 of FIG. 6. FIG. 8 is a section view of the shell structure unit cell 111 of FIG. 7 taken about section line 8-8 of FIG. 7. The illustrated embodiment of the shell structure unit cell 111 is different than, for example, the embodiment of the shell structure unit cell 111 of FIGS. 1-4. More specifically, the shell structure unit cell 111 of FIGS. 5-8 is generally cubic shaped.

In particular, the shell structure unit cell 111 of FIGS. 5-8 is a face-centered-style unit cell. That is, the illustrated shell structure unit cell 111 includes a plurality of hollow corner junctions 502 and a plurality of hollow face junctions 504. The illustrated shell structure unit cell 111 also includes a corner junction 502 at each corner of the illustrated cubic shaped cell. Each corner junction 502 at a corner is shared between adjacent shell structure unit cells 111 of the plurality of shell structure unit cells 500 (as shown in FIG. 5), such that within a lattice structure, such as lattice structure 102, a fully formed junction is formed from eight individual shell structure unit cells 111. As such, each corner junction 502 contains ⅛ of a fully formed junction.

In addition, the illustrated shell structure unit cell 111 includes a face junction 504 at the center of each face of the cubic shaped cell. Each face junction 504 at a face center is shared between adjacent shell structure unit cells 111 of the plurality of shell structure unit cells 500, such that within the lattice structure 102, a fully formed junction is formed from two shell structure unit cells 111. As such, each face junction 504 contains ½ of a fully formed junction.

Furthermore, the illustrated shell structure unit cell 111 includes a plurality of connectors 506. In particular, each connector 506 extends between a corner junction 502 and an adjacent face junction 504. As such, each respective corner junction 502 includes three connectors 506 extending away from the corner junction 502, where each respective connector 506 extends to a respective adjacent face junction 504. In the illustrated embodiment, the connectors 506 have a hyperboloid of one sheet shape and are hollow. That is, the connectors 506 are hollow hyperboloid-shaped tubes extending between the junctions 502 and 504, generating a curved transition between the junctions 502 and 504. Alternatively, the connectors 506 can have any shape that enables the shell structure unit cell 111 to function as described herein. As shown in FIG. 6, each of the three connectors 506 extending away from a corner junction 502 intersect to form a passage between the respective corner junction 502 and the three adjacent face junctions 504.

Furthermore, the illustrated shell structure unit cell 111 has a length 508. In addition, each face junction 504 has a length 510, and as such, each corner junction 502 has a length 512 that is ½ length 510. Face curves 514 of the four corners of each face junction 504 and the corner junctions 502 on each face of the shell structure unit cell 111 are hyperbolas defined in part by the hyperboloid-shaped connectors 506. While the corner junction 502, the face junction 504, and the connectors 506 are described herein as being hollow, it is noted that each of the corner junction 502, the face junction 504, and the connectors 506 are formed as thin-walled members having a substantially similar wall thickness 516. In the illustrated embodiment, the lengths 508, 510, and 512, the face curves 514, and the wall thickness 516 are configured to form an isotropic shell structure unit cell 111, such that a stiffness of the shell structure unit cell 111 is substantially similar in all directions.

A technical effect of the present disclosure includes at least one of: (a) replacing the solid structure of a component with a lattice structure comprising a plurality of shell structure unit cells; (b) reducing the weight of a component; (c) defining at least two internal fluid paths in each shell structure unit cell; and (d) creating a component wherein at least one or more of a plurality of shell structure unit cells extends through and beyond a boundary wall to prevent increased stress and, in particular, preventing stress risers that frequently form where unit cells contact the outer walls of a component and preventing structural stiffness discontinuities at a lattice-wall interface(s).

Figure 9:
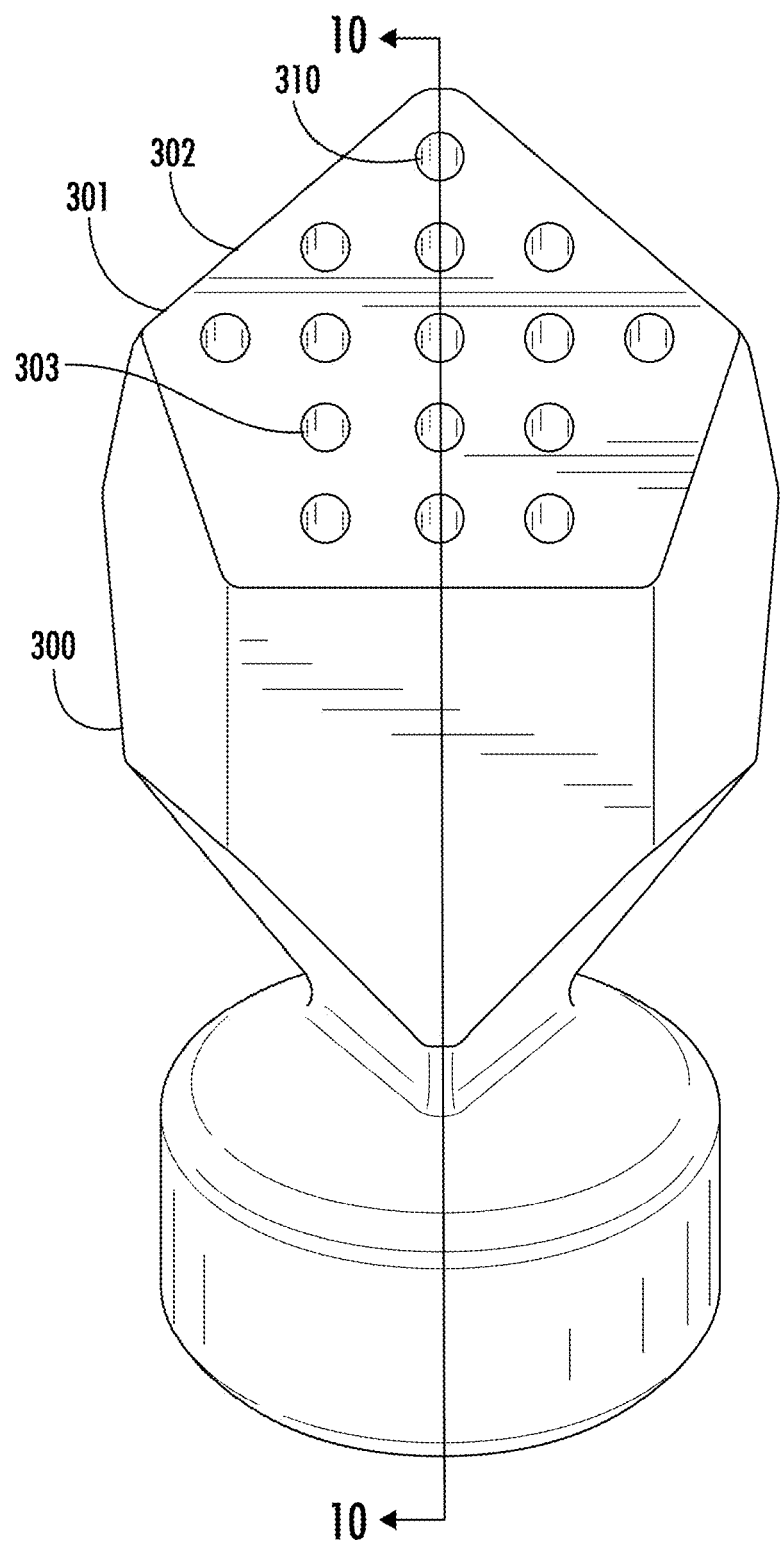
FIG. 9 shows a perspective view of an embodiment of an additively manufactured component formed of a lattice structure with a plurality of shell structure unit cells according to the present disclosure.
Figure 10:
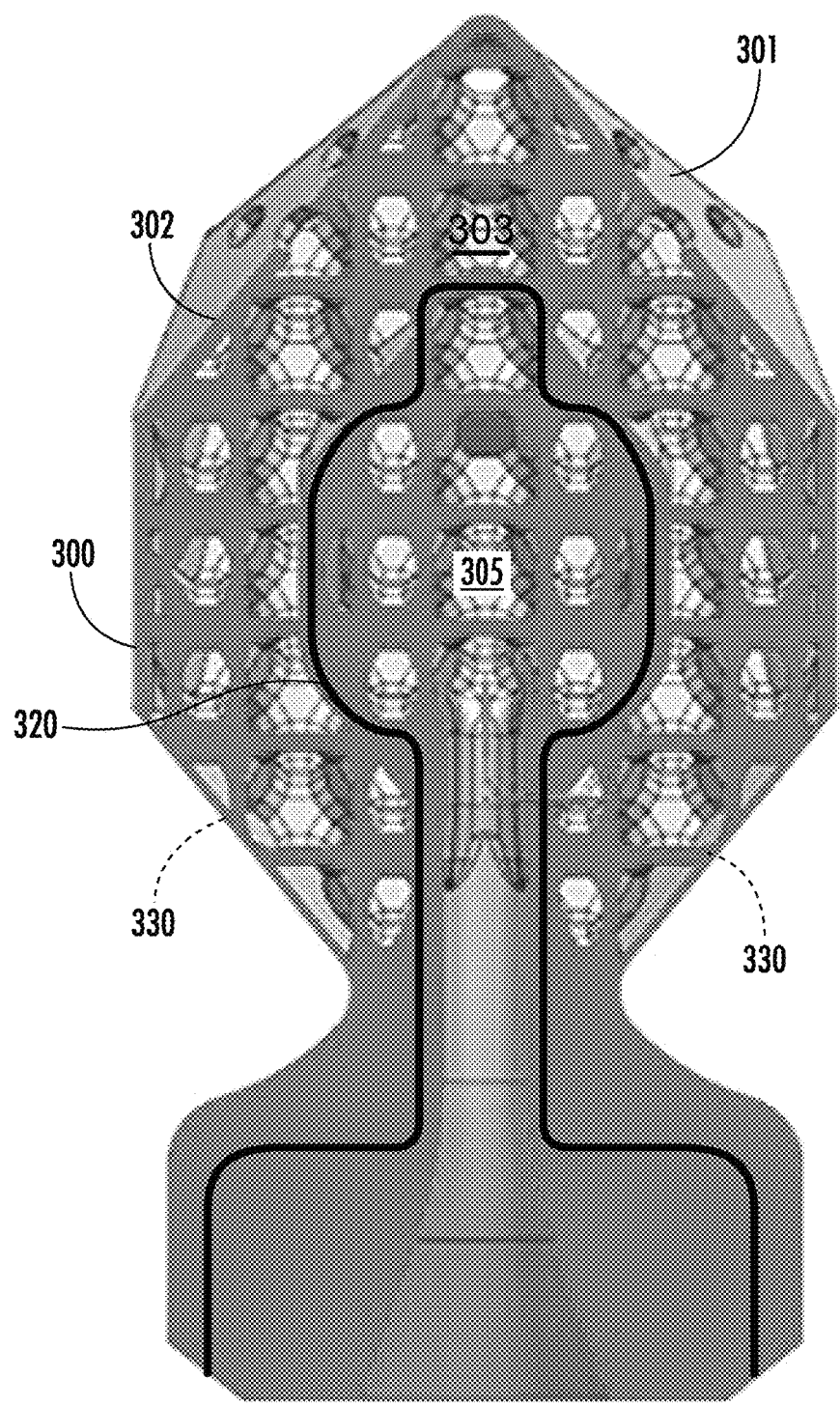
FIG. 10 is a cross-sectional view of the component illustrated in FIG. 9 along section line 10-10.

Referring now to FIGS. 9-10, various views of an exemplary embodiment according to the present disclosure are illustrated. FIG. 9 is a perspective view of another embodiment of a component 300, such as a structural light-weighting component or a heat exchanger component, according to the present disclosure. FIG. 10 is a cross-sectional view of the component 300 illustrated in FIG. 9 along section line 10-10, particularly illustrating the component 300 having two fluid domains and formed of a lattice structure 302 as explained and described herein. In other embodiments, the component 300 may have any number of fluid domains.

Accordingly, in the illustrated embodiment of FIGS. 9-10, the lattice structure 302 replaces a solid material or structure within the component 300. An external boundary wall 301 bounds the lattice structure 302. Moreover, as best shown in FIG. 10, a first fluid domain 303 is defined within the component 300, and a second fluid domain 305 is defined within the component 300 and nested within the first fluid domain 303. The first fluid domain 303 is open to the external space. The second fluid domain 305 is configured to hold and contain a pressurized fluid. The component 300, therefore, has a reduced weight and density when compared to an equivalent solid component of the same material, while maintaining the ability of the component 300 to carry a load.

In particular, as shown in FIG. 10, the lattice structure 302 includes a plurality of shell structure unit cells 310 arranged in a lattice configuration within the component 300. Moreover, the component 300 further includes the external boundary wall 301 and a pressurized boundary wall 320. For example, in an embodiment, the external boundary wall 301 or the pressurized boundary wall 320, similar to the shell structure unit cells 310, may be formed using an additive manufacturing process. Accordingly, the external boundary wall 301 or the pressurized boundary wall 320 can be formed with any suitable shape, geometry, and/or configuration as needed for the component 300 to operate as described herein.

Returning to the illustrated embodiment of FIGS. 9-10, the pressurized boundary wall 320 is a "pressurized" boundary wall in that it is configured to hold and contain a pressurized fluid. For example, the pressurized boundary wall 320 and the lattice structure 302 define the second fluid domain 305 of the component 300, and the second fluid domain is configured to hold and contain a pressurized fluid.

On the other hand, although the pressurized boundary wall 320, the lattice structure 302, and the external boundary wall 301 define the first fluid domain 303, the first fluid domain 303 is not configured to hold and contain a pressurized fluid as the first fluid domain 303 is open to the external space. However, in other embodiments, the first fluid domain is configured to hold and contain a pressurized fluid and, therefore, the external boundary wall 301 may be a pressurized external boundary wall.

Furthermore, and still referring to FIGS. 9-10, the shell structure unit cells 310 of the component 300 are configured such that a stiffness of the component 300 is isotropic. That is, the stiffness of the component 300 is substantially the same in all directions. As such, the lattice structure 302 also has a stiffness that is substantially the same in all directions.

Moreover, as shown at FIG. 10, at least one 330 of the shell structure unit cells 310 extend through and beyond the pressurized boundary wall 320. In such embodiments, by continuing at least one 330 of the shell structure unit cells 310 beyond the pressurized boundary wall 320, structural continuity of the component 300 is improved. Furthermore, due to the isotropic properties of the shell structure unit cells 310, the component 300 has the technical effect of more evenly distributing the forces acting on the lattice structure 302, thereby reducing stress around or within the bounds of the boundary wall 320. In particular, continuing at least one 330 of the shell structure unit cells 310 beyond the pressurized boundary wall 320 assists with preventing stress risers in the lattice structure 302. In addition, in certain embodiments, continuing at least one 330 of the shell structure unit cells 310 beyond the pressurized boundary wall 320 also has the technical effect of allowing the boundary wall 320 to be thinner than conventionally-structured components, which in turn allows the component 300 to better tolerate high thermal environments and/or heat treatment up to, for example, about 1000.0 degrees Celsius and pressure treatment up to, for example, about 250.0 bar. Thermal gradients are also better tolerated by the component 300.

Figure 11:
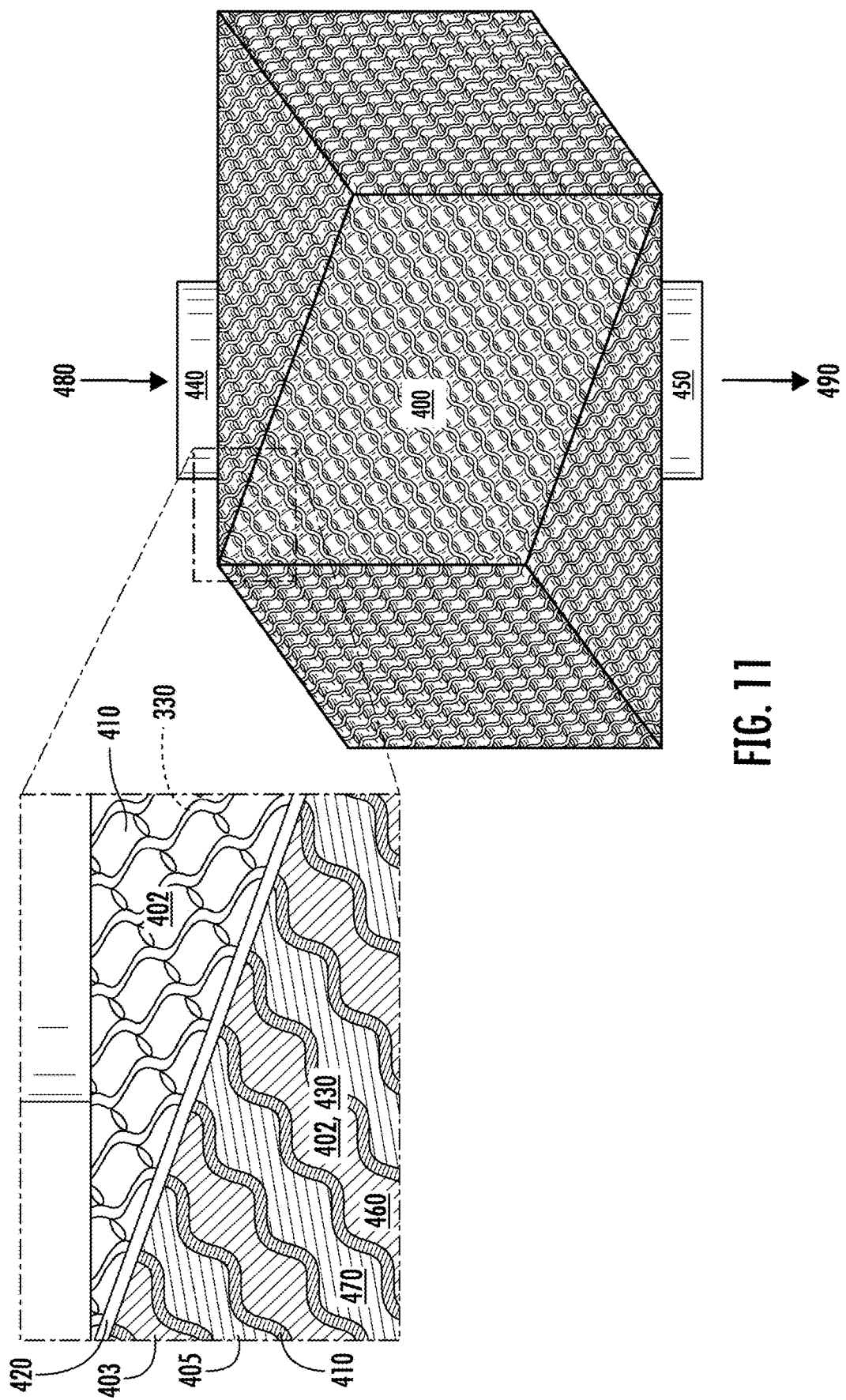
FIG. 11 is a partial cut-away view an embodiment of a heat exchanger assembly formed of a lattice structure with a plurality of shell structure unit cells according to embodiments of the present disclosure.

Referring now to FIG. 11, a partial cut-away view of an embodiment of a heat exchanger assembly 400 according to the present disclosure is illustrated. In particular, the heat exchanger assembly 400 may be manufactured using the manufacturing methods described herein. Thus, as shown, the heat exchanger assembly 400 includes a lattice structure 402 having a plurality shell structure unit cells 410, and the lattice structure 402 defines two fluid domains 403,405. In other embodiments, the heat exchanger assembly 400 may have any number of fluid domains.

The heat exchanger assembly 400 also includes a pressurized external boundary wall 420 surrounding the lattice structure 402. The pressurized external boundary wall 420 bounds the first fluid domain 403 and the second fluid domain 405 of the heat exchanger assembly 400. In particular, as shown, the first fluid domain 403 runs adjacent to the second fluid domain 405 within the lattice structure 402, and the first fluid domain 403 and the second fluid domain 405 define an active heat exchanger portion 430 of the heat exchanger assembly 400. The active heat exchanger portion 430 includes a first working fluid 460 contained within the first fluid domain 403 and a second working fluid 470 contained within the second fluid domain 405, all bound by the pressurized external boundary wall 420.

Moreover, in order for the first working fluid 460 of the first fluid domain 403 and the second working fluid 470 of the second fluid domain 405 to be able to circulate within the active heat exchanger portion 430 of the heat exchanger assembly 400, each shell structure unit cell of the plurality of cell structure unit cells 410 of the lattice structure 402 includes at least two internal fluid paths: one corresponding to an input fluid flow for the active heat exchanger portion 430, and another corresponding to an output fluid flow for the active heat exchanger portion 430 of the heat exchanger assembly 400. Thus, as shown in FIG. 11, the heat exchanger assembly 400 also includes an input conduit 440 configured to direct a corresponding pressurized input fluid flow 480 into each of the fluid domains 403,405 of the active heat exchanger portion 430, and includes an output conduit 450 configured to direct a corresponding pressurized output fluid flow 490 out of each of the fluid domains 403,405 of the active heat exchanger portion 430.

In certain embodiments, the components of the present disclosure, such as component 300 and heat exchanger assembly 400, may be manufactured using an additive manufacturing process. Additive manufacturing processes as used herein may include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3 SP—Scan, Spin, and Selectively Photocure, CLIP—Continuous Liquid Interface Production, SLS—Selective Laser Sintering, DMLS—Direct Metal Laser Sintering, DMLM—Direct Metal Laser Melting, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Binder Jetting, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

Figure 12:
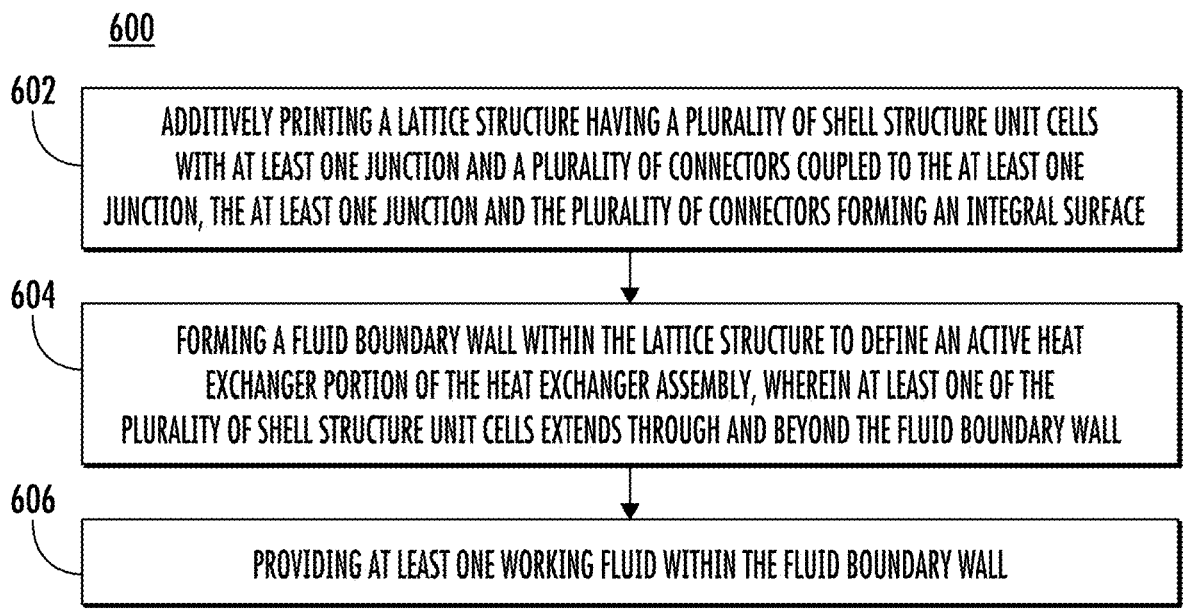
FIG. 12 shows a flow diagram of an embodiment of a method of manufacturing a heat exchanger assembly for a rotary machine according to the present disclosure.

Referring now to FIG. 12, a flow diagram of a method 600 of manufacturing a heat exchanger assembly, such as heat exchanger assembly 400, according to embodiments of the present disclosure is illustrated. In particular embodiments, the heat exchanger assembly 400 may be utilized in rotary machines, such as gas turbine engines. Although FIG. 12 depict steps performed in a particular order for purposes of illustration and discussion, the methods discussed herein are not necessarily limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (602), the method 600 includes additively printing a lattice structure having a plurality of shell structure unit cells with at least one junction and a plurality of connectors coupled to the at least one junction, the at least one junction and the plurality of connectors forming an integral surface. Further, as shown at (604), the method 600 includes forming a fluid boundary wall within the lattice structure to define an active heat exchanger portion of the heat exchanger assembly, wherein at least one of the plurality of shell structure unit cells extends through and beyond the fluid boundary wall.

As shown at (606), the method 600 includes providing at least one working fluid within the fluid boundary wall. In certain embodiments, the method 600 may further include pressurizing the lattice structure and the fluid boundary wall defined within the lattice structure. Further, in an embodiment, the method 600 may include heat treating the lattice structure and the fluid boundary wall defined within the lattice structure. Moreover, in an embodiment, the method 600 may further include removing portions of shell structure unit cells from outside the active heat exchanger portion of the component. For example, in an embodiment, the method 600 may further include removing portions of shell structure unit cells from outside the active heat exchanger, wherein portions of at least one of the plurality of shell structure unit cells extends through and beyond the fluid boundary wall after the removing portions of the shell structure unit cells from outside the active heat exchanger portion.

Further aspects are provided by the subject matter of the following clauses:

A heat exchanger assembly, comprising: a lattice structure comprising a plurality of shell structure unit cells, each of the plurality of shell structure unit cells comprising at least one junction and a plurality of connectors coupled to the at least one junction, the at least one junction and the plurality of connectors forming an integral surface; and a fluid boundary wall defined within the lattice structure to define an active heat exchanger portion of the heat exchanger assembly, the active heat exchanger portion comprising at least one working fluid contained within the fluid boundary wall, wherein at least one of the plurality of shell structure unit cells extends through and beyond the fluid boundary wall.

The heat exchanger assembly of the preceding clause, wherein the lattice structure is formed via an additive manufacturing process.

The heat exchanger assembly of the preceding clause, wherein the additive manufacturing process is at least one of a DMLS (Direct Metal Laser Sintering) process, a DMLM (Direct Metal Laser Melting) process, a SLM (Selective Laser Melting) process, a Binder Jetting process, or a Hybrid Systems process.

The heat exchanger assembly of any of the preceding clauses, wherein the plurality of shell structure unit cells are configured as a plurality of isotropic shell structure unit cells.

The heat exchanger assembly of any of the preceding clauses, wherein the fluid boundary wall is a pressurized fluid boundary wall.

The heat exchanger assembly of any of the preceding clauses, wherein the plurality of connectors of each of the plurality of shell structure unit cells are configured as an ordered triplet of connectors, and wherein the ordered triplet of connectors are pair-wise perpendicular.

The heat exchanger assembly of any of the preceding clauses, wherein each of the plurality of shell structure unit cells defines at least a first fluid path and a second fluid path, the first fluid path corresponding to an input fluid flow for the active heat exchanger portion of the heat exchanger assembly and the second fluid path corresponding to an output fluid flow for the active heat exchanger portion of the heat exchanger assembly.

The heat exchanger assembly of any of the preceding clauses, wherein the heat exchanger assembly is part of a gas turbine engine.

A method of manufacturing a heat exchanger assembly for a rotary machine, the method comprising: additively printing a lattice structure having a plurality of shell structure unit cells with at least one junction and a plurality of connectors coupled to the at least one junction, the at least one junction and the plurality of connectors forming an integral surface; and forming a fluid boundary wall within the lattice structure to define an active heat exchanger portion of the heat exchanger assembly, wherein at least one of the plurality of shell structure unit cells extends through and beyond the fluid boundary wall; and providing at least one working fluid within the fluid boundary wall.

The method of the preceding clause, wherein additively printing the lattice structure further comprises additively manufacturing the lattice structure via at least one of a DMLS (Direct Metal Laser Sintering) process, a DMLM (Direct Metal Laser Melting) process, a SLM (Selective Laser Melting) process, a Binder Jetting process, or a Hybrid Systems process.

The method of any of the preceding clauses, wherein the fluid boundary wall is a pressurized fluid boundary wall.

The method of the preceding clause, further comprising heat treating the lattice structure and the fluid boundary wall defined within the lattice structure.

The method of the preceding clauses, further comprising removing portions of shell structure unit cells from outside the active heat exchanger portion.

The method of the preceding clause, wherein portions of at least one of the plurality of shell structure unit cells extends through and beyond the fluid boundary wall after the removing portions of shell structure unit cells from outside the active heat exchanger portion.

An additively manufactured lattice structure, comprising: a plurality of shell structure unit cells, each of the plurality of shell structure unit cells comprising at least one junction and a plurality of connectors coupled to the at least one junction, the at least one junction and the plurality of connectors forming an integral surface; and a boundary wall defined within the lattice structure; wherein at least one of the plurality of shell structure unit cells extends through and beyond the boundary wall.

The additively manufactured lattice structure of the preceding clause, wherein the additively manufactured lattice structure is formed via at least one of a DMLS (Direct Metal Laser Sintering) process, a DMLM (Direct Metal Laser Melting) process, a SLM (Selective Laser Melting) process, a Binder Jetting process, or a Hybrid Systems process.

The additively manufactured lattice structure of any of the preceding clauses, wherein the plurality of shell structure unit cells are a plurality of isotropic shell structure unit cells.

The additively manufactured lattice structure of any of the preceding clauses, wherein the fluid boundary wall is a pressurized fluid boundary wall.

The additively manufactured lattice structure of any of the preceding clauses, wherein the plurality of connectors of each of the plurality of shell structure unit cells are configured as an ordered triplet of connectors, and wherein the ordered triplet of connectors are pair-wise perpendicular.

The additively manufactured lattice structure of any of the preceding clauses, wherein the additively manufactured lattice structure is part of a gas turbine engine.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A heat exchanger assembly, comprising:
   a lattice structure comprising a plurality of shell structure unit cells, each of the plurality of shell structure unit cells comprising at least one junction and a plurality of connectors coupled to the at least one junction, the at least one junction and the plurality of connectors forming an integral surface; and
   a fluid boundary wall defined within the lattice structure to define an active heat exchanger portion of the heat exchanger assembly and an inactive heat exchanger portion of the heat exchanger assembly, the active heat exchanger portion comprising at least one working fluid contained within the fluid boundary wall, the inactive heat exchanger portion lacking working fluids including the at least one working fluid,
   wherein at least one of the plurality of shell structure unit cells extends through and beyond the fluid boundary wall to define a first region that is part of the active heat exchanger portion and a second region that is part of the inactive heat exchanger portion.

2. The heat exchanger assembly of claim 1, wherein the lattice structure is an additively manufactured lattice structure.

3. The heat exchanger assembly of claim 2, wherein the additively manufactured lattice structure is formed via at least one of a DMLS (Direct Metal Laser Sintering) process, a DMLM (Direct Metal Laser Melting) process, a SLM (Selective Laser Melting) process, a Binder Jetting process, or a Hybrid Systems process.

4. The heat exchanger assembly of claim 1, wherein the plurality of shell structure unit cells are configured as a plurality of isotropic shell structure unit cells.

5. The heat exchanger assembly of claim 1, wherein the fluid boundary wall is a pressurized fluid boundary wall.

6. The heat exchanger assembly of claim 1, wherein the plurality of connectors of each of the plurality of shell structure unit cells are configured as an ordered triplet of connectors, and wherein the ordered triplet of connectors are pair-wise perpendicular.

7. The heat exchanger assembly of claim 1, wherein the lattice structure and the fluid boundary wall define a first fluid domain and a second fluid domain of the active heat exchanger portion of the heat exchanger assembly, the first fluid domain running adjacent to the second fluid domain within the lattice structure, the first fluid domain containing a first working fluid and the second fluid domain containing a second working fluid.

8. The heat exchanger assembly of claim 1, wherein a gas turbine engine comprises the heat exchanger assembly.

9. A method of manufacturing a heat exchanger assembly for a rotary machine, the method comprising:
   forming a lattice structure having a plurality of shell structure unit cells with at least one junction and a plurality of connectors coupled to the at least one junction, the at least one junction and the plurality of connectors forming an integral surface; and
   forming a fluid boundary wall within the lattice structure to define an active heat exchanger portion of the heat exchanger assembly and an inactive heat exchanger portion of the heat exchanger assembly, wherein at least one of the plurality of shell structure unit cells extends through and beyond the fluid boundary wall; and
   providing at least one working fluid within the fluid boundary wall.

10. The method of claim 9, wherein forming the lattice structure comprises additively manufacturing the lattice structure, and wherein additively manufacturing the lattice structure comprises at least one of a DMLS (Direct Metal Laser Sintering) process, a DMLM (Direct Metal Laser Melting) process, a SLM (Selective Laser Melting) process, a Binder Jetting process, or a Hybrid Systems process.

11. The method of claim 9, wherein the fluid boundary wall is a pressurized fluid boundary wall.

12. The method of claim 9, further comprising heat treating the lattice structure and the fluid boundary wall defined within the lattice structure.

13. The method of claim 9, further comprising removing portions of shell structure unit cells from outside the active heat exchanger portion.

14. The method of claim 13, wherein portions of at least one of the plurality of shell structure unit cells extends through and beyond the fluid boundary wall after the removing the portions of shell structure unit cells from outside the active heat exchanger portion.

15. An additively manufactured lattice structure, comprising:
   a plurality of shell structure unit cells, each of the plurality of shell structure unit cells comprising at least one junction and a plurality of connectors coupled to the at least one junction, the at least one junction and the plurality of connectors forming an integral surface; and
   a boundary wall defined within the lattice structure;
   wherein at least one of the plurality of shell structure unit cells extends through and beyond the boundary wall to define a first region configured to house a working fluid and a second region fluidly separated from the first region and configured to lack the working fluid.

16. The additively manufactured lattice structure of claim 15, wherein the additively manufactured lattice structure is formed via at least one of a DMLS (Direct Metal Laser Sintering) process, a DMLM (Direct Metal Laser Melting) process, a SLM (Selective Laser Melting) process, a Binder Jetting process, or a Hybrid Systems process.

17. The additively manufactured lattice structure of claim 15, wherein the plurality of shell structure unit cells are a plurality of isotropic shell structure unit cells.

18. The additively manufactured lattice structure of claim 15, wherein the boundary wall is a pressurized boundary wall.

19. The additively manufactured lattice structure of claim 15, wherein the plurality of connectors of each of the plurality of shell structure unit cells are configured as an ordered triplet of connectors, and wherein the ordered triplet of connectors are pair-wise perpendicular.

20. The additively manufactured lattice structure of claim 15, wherein the additively manufactured lattice structure is part of a gas turbine engine.

* * * * *